June 6, 1967 — G. A. KIRKPATRICK — 3,323,832
SEAT BELT
Filed Feb. 6, 1964 — 2 Sheets-Sheet 1

INVENTOR.
GLEN A. KIRKPATRICK
ATTORNEYS

United States Patent Office 3,323,832
Patented June 6, 1967

3,323,832
SEAT BELT
Glen A. Kirkpatrick, Rochester, N.Y., assignor of twelve and one-half percent to Winslow E. Thomson and twelve and one-half percent to John R. Schovee
Filed Feb. 6, 1964, Ser. No. 343,026
4 Claims. (Cl. 297—388)

This invention relates generally to belts and more specifically to retractable safety seat belts.

Known satisfactory safety seat belts for use in automobiles, aircraft and other vehicles and for other purposes have in the past been of generally two varieties, a manually adjustable seat belt and a retractable automatically adjusting seat belt. Both types have consisted of two lengths of fabric webbing, each length being anchored or fixed to the floor or other rigid structure of the vehicle and extending through the seat and are adapted for confining the passenger to the seat. Each of the lengths of fabric webbing or belting has a free end, one of which carries a buckle and the other of which carries a latch element adapted for locking with the belt buckle.

The buckle of the manually adjustable variety of seat belts has generally been provided with a friction clamping device for adjustment of the belt length. They are inconvenient to adjust, often fall on the floor where they lie in the dirt and water which subsequently soils clean clothing which the belt overlies when in the locked position, and they are generally unsightly in the car seat. The great inconvenience resulting from the frequency with which manual adjustment of the length of the belt is required due to difference in waist and thigh measurements of the passengers has given rise to known retractable seat belts generally comprising a spring loaded mechanism anchored or fixed to the floor for retracting the seat belt. The inertial retractable seat belt is of a variety yieldingly restraining the passenger but is not effective to positively confine the passenger to the seat until an accident actually occurs at which time the impact or force of the accident is effective to automatically lock the spring loaded retractable means in a locked position.

It is one object of my invention to provide an improved retractable seat belt which is automatically retracted when not in use, but upon latching of the latch element in the buckle, the belt is positively locked in adjusted position to comfortably confine the passenger to the seat at all times during occupancy without the constant belt tension about his torso experienced by using the inertial type retractable seat belt.

A further object of my invention is to provide a simplified retractable belt construction suitable for automatic retraction and length adjustment to confine people or objects to the vehicle seat by interlocking of the free ends of the belting.

A further object of my invention is to provide a seat belt construction having the retractable means mounted in the buckle.

A further significant object of my invention is to provide a pair of retractable seat belt sections having coactive buckles for retracting and automatically locking both belt sections in adjusted position.

A further object of my invention is to provide an improved latching mechanism for belts of the above described nature.

Other objects and advantages of this invention will be particularly set forth in the claims and will be apparent from the following description, when taken in connection with the accompanying drawings, in which:

Figures 1, 2, 3:
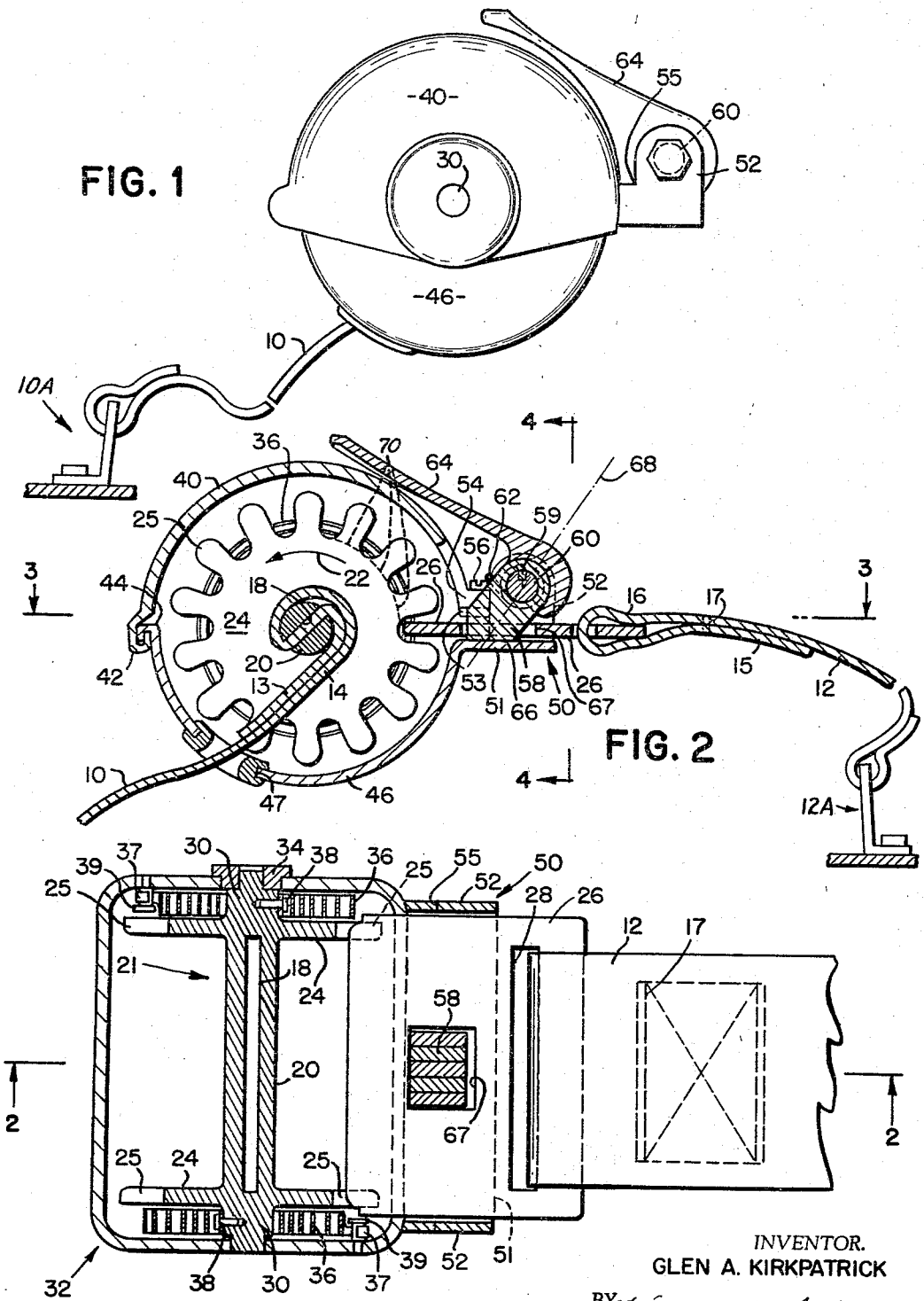
FIG. 1 is a side elevational view of one embodiment of the buckle construction of my invention.
FIG. 2 is a sectional view of the FIG. 1 embodiment of my invention taken along the line 2—2 of FIG. 3 looking in the direction indicated by the arrows.
FIG. 3 is a sectional view with the left belt removed of the FIG. 1 and FIG. 2 embodiment of my invention taken along the line 3—3 of FIG. 2 looking in the direction indicated by the arrows.

With reference to the FIGURES 1–4 inclusive, the first embodiment of my invention comprises a pair of belts or lengths of webbing 10 and 12 preferably constructed of woven nylon. Each of the belts 10 and 12 have free ends 13 and 15 (FIG. 2) respectively which are formed into loops 14 and 16, as for example, by stitching 17 (FIG. 3). The other ends of the belts 10 and 12 opposite the free ends 13 and 15, are in any known manner rigidly secured or anchored to the car floor as for example, as illustrated at 10A and 12A respectively or any other rigid structure satisfactory to absorb shock or pressure exerted upon the seat belt, when latched together in the manner described below.

The free end 13 of the left hand belt 10 is threaded through a slot 18 of a spindle portion 20 of a reel 21 before the loop is formed in the free end of the belt. After being threaded through the slot 18, the belt 10 is then stitched or in some other manner rigidly secured to overlie itself and form a loop, so that as the spindle portion 20 of reel 21 is rotated, the belt 10 will spirally wind upon itself in a counter-clockwise direction as indicated by the arrow 22.

Reel 21 has a pair of laterally extending longitudinally spaced flanges 24 for aligning the edges of the belt 10 as it is wound upon itself over the spindle portion 20 of the reel 21. Each of the flanges 24 are sprockets shaped with a plurality of spaced protrusions or projections 25 defining radially extending female latch receiving portions adapted to receive a latch element 26 in locking relationship in a manner described hereinafter.

Latch element 26 has a slot or cutout portion 28 receiving the free end of the belt 12 before being stitched at 17 to form the loop at the free end of the belt.

Reel 21 has a pair of stud portions 30 projecting beyond the sprocket flanges 24 and journalled into the sidewalls of a buckle or reel housing generally indicated by numeral 32. A bushing 34 may be interposed between the stud 30 and the buckle housing 32. The reel 21 is spring loaded in the buckle housing 32, as for example, by a pair of flat spiral springs 36 for urging the belt 10 to spirally wind upon itself over the spindle 20 in a counter-clockwise direction as indicated by the arrow 22 of FIG. 2.

The buckle 32 includes an upper housing portion 40 having a lip or vertical flange 42 (FIG. 2) adapted to interlock with a lip or vertical flange 44 or equivalent fastening to lower housing portion 46 of the buckle. Lower housing portion 46 has an opening 47 through which the belt 10 projects and through which it is retractable. The upper and lower housing portions 40 and 46, when in the assembled position shown in FIGS. 1–4 inclusive defining the buckle 32, provide a throat portion or latch guiding means generally indicated by the numeral 50 which is adapted to receive the latch element 26. The throat 50 is defined by a lower flange 51 (FIGS. 2 and 4) extending horizontally from the lower housing portion 46 and has a vertical extending portion 52 which is split, as for example at 55 (FIG. 3) to provide a horizontal extending portion 53 (FIG. 4) defining the upper edge of the throat 50. The upper housing portion 40 of the buckle 32 is provided with a short horizontal flange 54 (FIG. 2) which is adapted to overlie and is rigidly secured to the upper horizontal flange portion 53, as for example by a screw 56.

I provide a catch element 58 for interlocking latch element 26 with buckle 32. Catch element 58 comprises a plurality of laminated pieces of sheet steel rotatable about shaft 60 which is keyed at 59 to vertical portion 52 of flange 51. Catch element 58 rotatably mounted on shaft 60 is spring loaded in a counter-clockwise direction as viewed in FIG. 2 by a torsion spring 62 (FIG. 4) extending across the top of the catch element 58 and having free ends 63 (FIG. 4) rigidly secured to shaft 60. A catch release handle 64 rotatably mounted on shaft 60 provides a manually operable release mechanism whereby the passenger using my seat belt may simply apply finger pressure in a clockwise direction to the handle 64 causing catch 58 to rotate in a clockwise direction in opposition to the torsion spring 62.

The latch element 26 is provided with a slot or cut out portion 67 adapted to receive the catch 58 in locking relationship when latch 26 is received in the throat 50, thereby to lock the latch element 26 in the female latch receiving portions of sprocket flanges 24 defined by the sprocket protrusions 25 in the manner illustrated in FIGS. 2 and 3. Thus, I am able to lock the reel 21 in any selected position desired thereby to lock the belt 10 in selected adjusted position lengthwise thereof.

Figure 4:
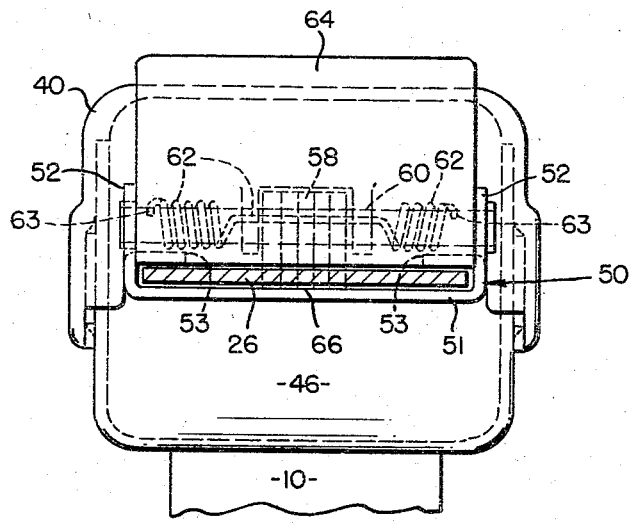
FIG. 4 is a right-hand end elevational view as seen in FIG. 2 taken along the line 4—4 of FIG. 2 looking in the direction indicated by the arrows.

As illustrated in FIGS. 2 and 4, the catch element 58 is provided with a lower flat surface 66 (FIGS. 2 and 4) frictionally bearing on the upper surface of horizontal flange 51 in the illustrated manner so that the catch 58 is angularly and transversely disposed of the throat 50 as indicated by the center line 68 extending between the center axis of the shaft 60 and the center of the flat surface 66. Thus, the axis 68 makes an acute angle with the throat 50 in a direction toward an unlocking force applied to the latch element 26. This construction increases the locking force between the catch element 58 and the latch 26 when an attempt is made to remove the latch element 26 from the buckle 32 while the catch 58 is in the locked position illustrated in FIG. 2.

In the FIGS. 1-4 embodiment of my invention, the belt 12 is preferably of a short length, i.e. six inches through the seat, whereas the belt 10 extends from the end where anchored to the floor of the automobile and across the waist of the passenger.

It will be understood from the foregoing description that, after the pasenger is seated in the automobile incorporating my seat belts, he simply embraces the buckle 32 with one hand and pulls the buckle 32 across his waist thereby unrolling the belt 10 which is spirally wound on the spindle 20. With his other hand the passenger inserts the latch element 26 into the throat 50 which automatically actuates the catch 58 in a clockwise direction permitting the latch element 26 to be slid into the locking relationship with the sprocket flanges 24. The catch 58 snaps into the locked position illustrated in FIG. 2 thereby to automatically lock the belt 10 in a selected adjusted position corresponding to the dimensions of the waist of the passenger-user.

When the passenger desires to release the confining seat belt, he simply takes one hand and releases the handle 64 with a very simple and convenient clockwise movement, as viewed in FIG. 2. Once the catch 58 is disengaged from latch 26, and latch element 26 is withdrawn from the throat 50, the springs 36 automatically retract the belt 10 on the spindle 20.

One variation of my invention is to provide the flange portions 24 of a frangible or fracturable material so that when accidents occur the teeth or projections 25 of the sprocket 24 may be fractured as illustrated in broken line at 70 by latch element 26 under selected stress conditions, thereby to successively absorb the shock of the accident.

Figure 5:
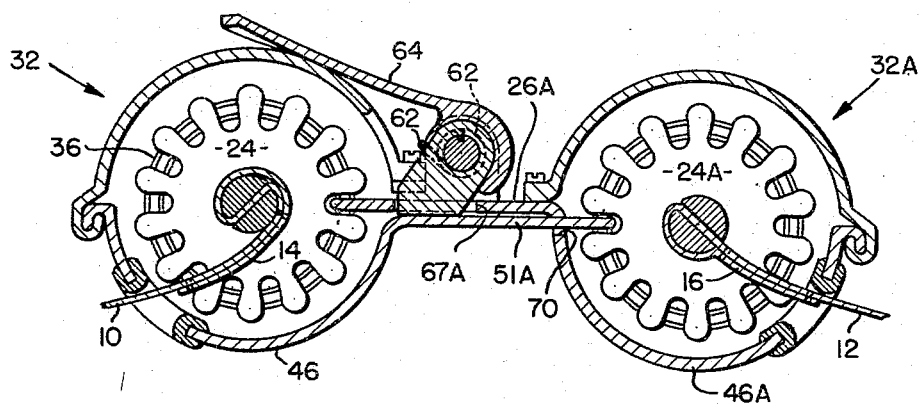
FIG. 5 is a sectional view of a second embodiment of my invention corresponding to the FIG. 2 sectional view of the first embodiment of my invention.

I now refer to FIG. 5 illustrating a second embodiment of my invention in which corresponding parts of the FIGS. 1-4 embodiment are designated with corresponding numerals. The FIG. 5 embodiment is distinguishable from the first described embodiment in that I have provided a pair of retractable buckles 32 and 32A respectively each being mounted on the free ends of the belts 10 and 12. Without numbering each element illustrated in FIG. 5 it will be understood that substantially all of the parts correspond to those illustrated in FIGS. 1-4 inclusive.

Parts of a retractable buckle 32-A corresponding to like parts of the buckle 32 are referred to by corresponding numerals followed by the suffix "A," and parts of both buckles 32 and 32-A which are modified from the FIGS. 1-4 embodiment are referred to by corresponding numerals followed by the suffix "A."

In the FIG. 5 embodiment, the lower horizontal flange 51-A serves as a latch element received within a slot or opening 70 in a lower buckle housing portion 46-A and received in locking relationship with a sprocket flange 24-A. The buckle 32-A is provided with a flange 26-A corresponding to the latch element 26 of the FIGS. 1-4 embodiment. Thus, when the latch elements 26-A and 51-A are brought into interlocking relationship with the sprocket flanges 24 and 24-A respectively, both the belts 10 and 12 are automatically locked in the adjusted position lengthwise.

While I have shown and described the preferred form of mechanism of my invention it will be apparent that various modifications and changes may be made therein particularly in the form and relation of parts, without departing from the spirit of my invention as set forth in the appended claims.

I claim:

1. A retractable belt construction comprising a first belt having a free end and being fixed at the other end; a belt buckle; retracting means mounted on said buckle, the free end of said belt being mounted on said retracting means for retraction thereof; first latch means on said retracting means; second latch means connected to means coactive with said belt for confining a passenger when said second latch means is locked with said buckle as hereinafter claimed; said second latch means being received in locking engagement with said first latch means for locking said retracting means in selected adjusted positions along said first belt and means on said buckle for locking said second latch means with said buckle when both said latch means are locked.

2. A belt construction in accordance with claim 1 in which said confining means includes a second belt having a free end attached to said second latch means and being fixed at the other end, said second latch means comprising; second retracting means mounted on the free end of said second belt for retracting said second belt; and means between both of said retracting means for locking said second retraction means in selected position along said second belt.

3. A retractable belt construction comprising a belt having a free end and being fixed at the other end; means mounted on said free end for retracting said belt, said means comprising a buckle element and a spring loaded reel having radial latch receiving elements and being mounted on said buckle element locking means including a latch means mounted on the free end of a second belt being fixed at its other end, said latch means being adapted to lock with said latch receiving elements for locking said retracting means in selected adjusted positions along said belt, and means on said buckle element for locking said latch means with said buckle element when said latch means is locked with one of said latch receiving elements.

4. A belt construction in accordance with claim 3 in which said latch means includes a second retracting means mounted on the free end of said second belt for retracting said second belt and including second latch receiving elements on said second retracting means, and a second latch means on said buckle element being received in locking engagement with said second latch receiving elements for locking said second retracting means in selected adjusted positions along said second belt simultaneously with the locking of said first retracting means.

References Cited

UNITED STATES PATENTS

| | | | |
|---|---|---|---|
| 2,811,385 | 10/1957 | Butler | 188—1 |
| 2,822,595 | 2/1958 | Ruhl. | |
| 2,964,815 | 12/1960 | Sereno | 24—230.1 |
| 3,020,089 | 2/1962 | Monroe | 297—388 |
| 3,116,092 | 12/1963 | Spanger | 297—388 |
| 3,126,072 | 3/1964 | Johansson | 297—386 |
| 3,233,296 | 2/1966 | Whittingham | 297—388 X |
| 3,248,148 | 4/1966 | Board et al. | 297—388 |

OTHER REFERENCES

Article entitled: "Roll-Up Device Ends Auto Seat Belt Clutter," The Detroit News, Aug. 29, 1963.

CASMIR A. NUNBERG, *Primary Examiner.*

FRANK B. SHERRY, *Examiner.*

R. B. FARLEY, *Assistant Examiner.*